US006332917B1

(12) United States Patent
Schöllkopf

(10) Patent No.: US 6,332,917 B1
(45) Date of Patent: Dec. 25, 2001

(54) PROCESSING SYSTEM FOR THE PREPARATION OF COMPRESSED AIR

(75) Inventor: Horst Schöllkopf, Stuttgart (DE)

(73) Assignee: J. Lorch Gesellschaft & Co. GmbH, Waldenbuch (DE)

( * ) Notice: Subject to any disclaimer, the term of this patent is extended or adjusted under 35 U.S.C. 154(b) by 0 days.

(21) Appl. No.: 09/355,977

(22) PCT Filed: Nov. 21, 1997

(86) PCT No.: PCT/EP97/06531

§ 371 Date: Oct. 25, 1999

§ 102(e) Date: Oct. 25, 1999

(87) PCT Pub. No.: WO98/37332

PCT Pub. Date: Aug. 27, 1998

(30) Foreign Application Priority Data

Feb. 21, 1997 (DE) ............................................ 197 06 895

(51) Int. Cl.[7] .................................................... B01D 46/46

(52) U.S. Cl. ......................... 96/397; 96/417; 55/DIG. 17

(58) Field of Search ................................ 95/1, 8, 12, 14, 95/15, 19, 22, 23, 24, 25; 96/397, 399, 400, 401, 402, 405, 406, 407, 408, 411, 412, 417, 420, 421, 422, FOR 170; 55/DIG. 17, DIG. 34; 417/1, 26, 36, 43, 63

(56) References Cited

U.S. PATENT DOCUMENTS 4,330,237 * 5/1982 Battah .................................... 417/26
4,356,006 * 10/1982 Miller et al. ............................. 95/19
4,437,813 * 3/1984 Ingram ........................... 55/DIG. 17
4,586,870 * 5/1986 Hohlweg et al. ....................... 417/26
4,655,049 * 4/1987 Andrews et al. ....................... 96/400
4,819,123 * 4/1989 Hatimaki ................................ 417/26
5,096,598 * 3/1992 Pecen et al. ........................... 96/408
5,461,368 * 10/1995 Comer .................................... 96/421
5,496,388 * 3/1996 Tellier .................................... 96/397
5,797,980 * 8/1998 Fillet ............................ 55/DIG. 17
5,820,352 * 10/1998 Gunn et al. ............................ 417/26
5,820,642 * 10/1998 Nagai et al. .................... 55/DIG. 17
6,077,330 * 6/2000 Sabelstrom ............................... 95/25

FOREIGN PATENT DOCUMENTS

0303838 * 2/1989 (EP) .............................. 55/DIG. 17
2277462 * 11/1994 (GB) ............................. 55/DIG. 17

OTHER PUBLICATIONS

Seeger, Jorg: Air–Management—die neue Dimension der Druckluft–Aufbereitung In: O+P Olhydraulik und Pneumatik 1996, No. 1, pp. 51–53.

* cited by examiner

*Primary Examiner*—Duane S. Smith
(74) *Attorney, Agent, or Firm*—Jones, Tullar & Cooper, P.C.

(57) ABSTRACT

The present invention relates to a processing system for the preparation of compressed air made up of individual units, such as a filter unit, a control unit, an oiler unit and/or the like. The individual units are connected to each other by means of a system bus. The present invention also provides for an interface by which the system bus is operatively linked with the customer bus, which in turn can be connected to a control device.

16 Claims, 1 Drawing Sheet

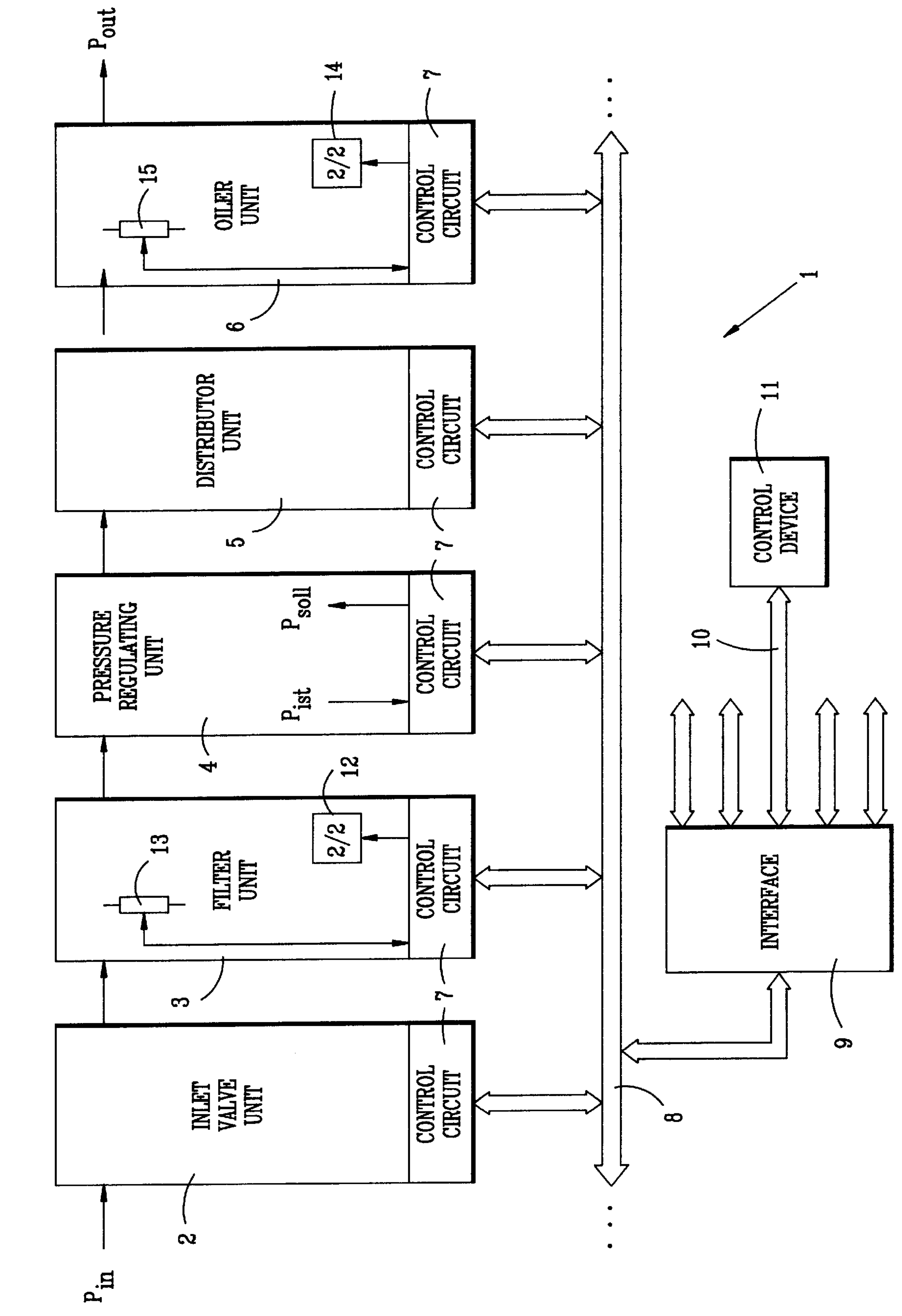
$P_{out}$
$P_{in}$
OILER UNIT
DISTRIBUTOR UNIT
PRESSURE REGULATING UNIT
FILTER UNIT
INLET VALVE UNIT
CONTROL CIRCUIT
CONTROL CIRCUIT
CONTROL CIRCUIT
CONTROL CIRCUIT
CONTROL CIRCUIT
2/2
2/2
$P_{soll}$
$P_{ist}$
CONTROL DEVICE
INTERFACE
1
2
3
4
5
6
7
8
9
10
11
12
13
14
15

PROCESSING SYSTEM FOR THE PREPARATION OF COMPRESSED AIR

FIELD OF THE INVENTION

The present invention relates to a processing system for the preparation of compressed air composed of individual units, for example a filter unit, a regulating unit, an oiler unit and/or the like, which can be connected with a control device by means of a bus provided the customer bus.

BACKGROUND OF THE INVENTION

Such processing systems for compressed air are generally known and commercially available. In these known systems, each one of the units contained therein, provided it contains electrical sensors or active elements, is separately connected to the control device. This means that all units are radially connected with the control device. The user can act on individual units with the aid of the control device, for example, he can control and/or regulate the interaction of the individual units of the compressed air processing system with the aid of controls which can be programmed and stored and are contained in the control device.

The individual units of the known compressed air processing systems can be combined in a modular way by the user. The user can select here which units are required in his present case of application and must be correspondingly selected. Thus, in the end the selection and the arrangement of the individual units define the compressed air processing system.

A disadvantage of the known compressed air processing system lies in that a considerable installation outlay is created with an increase in components because of the parallel wiring.

SUMMARY OF THE INVENTION

It is an object of the present invention to provide a processing system for compressed air which can cooperate with various control devices in the most flexible manner.

This object is attained by means of the present invention in a compressed air processing system of the type mentioned at the outset in that the units are connected with each other via a system bus and that an interface is provided, by means of which the system bus can be couple with the customer bus.

Thus, the individual units of the compressed air processing system of the present invention are no longer directly coupled with the control device. Instead, the present invention provides a decoupling of the units from the control device, which takes place by means of the interface. The units, which are connected with each other via a mutual system bus, are arranged on one side of the interface. Because of this the units and the system bus are completely independent of the control device used and can therefore always be designed to be similar, independently of this control device. The customer bus, by means of which the compressed air processing system can be connected to the control device of the respective user, is located on the other side of the interface. Thus, this other side of the interface depends on the control device and can be adapted in every case of application to the respectively used control device.

By means of a decoupling in accordance with the present invention of the units from the customer bus it is achieved that the compressed air processing system can be used in an extremely flexible manner. The extra outlay for the interface required by this is negligible in comparison with the usefulness. By means of the present invention it is achieved in particular that the individual units can be uniformly designed, which is coupled with great savings in the production costs of the units. It is also possible by means of the present invention to offer a compressed air processing system with which the user no longer needs to be bothered by possible bus connections, which depend on the type of control device or the like, but wherein the user can concentrate solely on the desired properties of the compressed air processing system. The operative linking of the individual units is automatically assured by the introduction of the interface in accordance with the invention.

In connection with an advantageous further development of the present invention, each of the individual units can also be directly connected with the customer bus. In this way it is made possible for a customer to employ the respective units also in a compressed air processing system in accordance with the prior art. It is understood that in this case the advantages of the present invention cannot be realized. On the other hand, however, a further possibility of employing the units is offered to the user.

In connection with an advantageous embodiment of the present invention, there are different protocols of the customer bus, wherein the interface is provided for a multitude of the protocols of the customer bus.

In what follows, a protocol of a customer bus is understood to be the way in which certain lines of the customer bus are electrically connected, for example, or how certain signals, for example, are generated in these lines, in particular in view of their chronological sequence, and are transferred to the customer bus. There obviously is a multitude of options as to how such a protocol of a customer bus can be determined. The result of this is that the interface of the compressed air processing system of the present invention must be adapted to these different possibilities of the protocols of the customer bus.

A first possibility of the adaptation can consist in that a defined interface is made available for each defined protocol of the customer bus. In this case the interface can be embodied as a component of the hardware. However, it is also possible to achieve the adaptation to the various protocols of the customer bus by means of software. In this case the interface is a hardware component, which is differently programmed in accordance with the respective protocol.

It is particularly useful that the interface is provided for a plurality of the protocols of the customer bus. In this case the interface is a hardware component which is adapted to the various protocols of the customer either by way of hardware and/or software. The advantage of this interface lies in that a user can use the same interface for different control devices. Therefore the user need not bother with bus connections or the like, which depend on the control device, but instead can concentrate directly on his application-specific compressed air processing system.

A further advantage of the present invention is achieved in that the interface is embodied as a further unit. The user can then use the interface like a further module in his compressed air processing system. As a whole, this results in a uniform system, which is closed in itself. The user then only needs to connect his control device to this system and can then begin using the compressed air processing system.

In further advantageous embodiments of the present invention, input signals can be issued to at least one of the units via the system bus, or respectively output signals can be transmitted by at least one of the units via the system bus. Thus, input and output signals are transmitted via the system bus. By means of this it is possible that these input and output signals are available on the system bus and can therefore be used by the individual units. This has the advantage that controls or regulating devices can be contained in the individual units, which make use of the noted input and output signals. Because of this the individual units can be designed to be considerably "more intelligent". In this way it is achieved that the entire compressed air processing system has a considerably greater flexibility and quality than the compressed air processing systems known up to now.

Further characteristics, application possibilities and advantages of the present invention ensue from the following description of exemplary embodiments, which are represented in the figures in the drawings. Here, all described or represented characteristics, by themselves or in any arbitrary combination, constitute the subject of the present invention, independently of their combination in the claims or their dependencies, as well as independently of their wording, or respectively representation, in the description, or respectively the drawings.

BRIEF DESCRIPTION OF THE DRAWINGS

The sole drawing FIGURE represents a schematic block circuit diagram of a compressed air processing system in accordance with the present invention.

DETAILED DESCRIPTION

The compressed air processing system 1 has a plurality of individual units, which are used for generating compressed air and for the control, or respectively regulation, of the generated compressed air.

An inlet valve unit 2 is provided, which is charged with a pressure $P_{in}$, and by means of which the entire compressed air processing system in particular can be turned on and off.

Moreover, a filter unit 3 is provided, which is connected via a compressed air line with the input valve unit 2 and which is used in particular for cleaning the compressed air. For example, a water separator, not shown in detail, is contained in the filter unit 3 for this purpose.

Furthermore, a pressure regulating unit 4 is provided in the compressed air processing system 1, which is connected via a compressed air line with the filter unit 3, and which is used in particular for regulating the compressed air to a desired set value $P_{soll}$.

A distributor unit 5 is furthermore provided, which is connected via a compressed air line with the pressure regulating unit 4 and is used for distributing the compressed air to the various places of use.

Finally, an oiler unit 6 is provided in the compressed air processing system 1, which is connected via a compressed air line with the distributor unit 5. The oiler unit 6 is provided with an output line, in which the pressure $P_{out}$ prevails. A so-called pulse oiler can be contained in the oiler unit 6, for example, which can release a defined amount of oil from an oil reservoir into the compressed air.

Each one of the described units 2, 3, 4, 5, 6 has an electrical control circuit 7, which is preferably designed in the same way in all units. The control circuit 7 is used for processing the electrical signals in the respective unit in regard to a uniform usage within the entire compressed air processing system 1.

The compressed air processing system 1 has a system bus 8 to which all units 2, 3, 4, 5, 6 are connected. Here, the coupling of the system bus 8 with the units takes place with the aid of the uniform processing of the electrical signals by the control circuit 7. In this case the uniform processing of the electrical signals is matched to the protocol of the system bus 8. In what follows, the protocol of the system bus 8 is to be understood as the way in which the individual lines of the system bus 8 are electrically switched and how the individual signals are generated in these lines, in particular in view of their chronological behavior, and are transmitted on the system bus 8.

Moreover, an interface 9 is provided in the compressed air processing system 1, one side of which is connected with the system bus 8. On its other side, the interface 9 is connected via a customer bus 10 with a control device 11.

A plurality of customer busses 10, which have different protocols, is provided on the side of the interface 9 connected with the control device 11. Again, the protocol of the customer busses is understood to be the manner in which the individual lines of the customer bus are electrically switched and how the individual signals are electrically generated in these lines, in particular in view of their chronological behavior, and are transmitted on the customer bus.

The mentioned different protocols of the customer bus 10 are provided for permitting different control devices to be connected directly to the interface 9. A control device 11, which thus works together with another protocol of the customer bus 10, is connected to the corresponding customer bus 10, provided with the respective protocol, of the interface 9 and thus is ready for use.

It is possible here that the protocol of the customer bus 10 and the protocol of the system bus 8 agree with each other. In other words, this means that it is possible to use an existing protocol of a customer bus 10 also as the protocol for the system bus 8. In this case it is possible to connect the control device 11 directly, i.e. without the interposition of the interface 9, to the system bus 8.

It is furthermore possible that the interface 9 is designed as a further unit. The already existing units 2, 3, 4, 5, 6, and the further unit for the interface 9, can then be put together module-like in a uniform device.

A further possibility lies in that the individual units 2, 3, 4, 5, 6 are also provided with connections which correspond to the protocol of a customer bus 10 and by means of which they can be directly connected with the control device 11.

Electrical and/or pneumatic components can be contained in the described units 2, 3, 4, 5, 6, on which input signals act, and/or which transmit output signals. In this case these input signals and/or output signals are conducted via the system bus 8.

It is therefore possible, that the filter unit 3 has, for example, a two-way valve 12, by means of which the mentioned water separator can be emptied. This two-way valve 12 is triggered by an input signal which, with the interposition of the control circuit 7, is also present on the system bus 8.

It is also possible that an output signal corresponding to the fill level of the water separator is generated in the filter unit 3, for example with the aid of an ohmic path sensor 13. This output signal is then also available on the system bus 8 via the control circuit 7.

It is moreover possible to provide the regulating unit 4 with an input signal for the desired set value $P_{soll}$ of the pressure of the processed compressed air, and/or to generate an output signal by the regulating unit, which corresponds to the present actual value $P_{ist}$ of this pressure. The input and output signals of the regulating unit 4 are then available in turn on the control bus 8 via the control circuit 7.

A further possibility lies in that the oiler unit 6 is acted upon by an input signal, which results in the introduction of a defined amount of oil into the compressed air. A two-way valve 14 or the like can be provided for this. It is also possible to generate an output signal in the oiler unit 6, which corresponds to the fill level of the oil in an oil reservoir, from which the amount of oil is released into the compressed air. This fill level can also be detected with the aid of an ohmic path sensor 15. The input and output signals are then available in turn on the control bus 8 via the control circuit 7.

All output signals sent to the system bus 8 by the units 2, 3, 4, 5, 6 are present at the interface 9 and are passed on from there via the customer bus 10 to the control device 1 1. With an appropriate layout of the control device 11, the user can read off the values of these output signals and, if desired, store them. Moreover, inter alia the user can produce application-specific controls or regulations on the basis of these output signals, for whose execution the control device 11 passes on, for example the input signals, to the system bus 8 via the customer bus 10 and the interface 9. These input signals then act, as described, on the individual units 2, 3, 4, 5, 6, and are further processed there with the aid of the control circuits 7.

It is furthermore possible that the output signals available on the system bus 8 are read in directly, i.e. without the interposition of the control device 11, by the individual units 2, 3, 4, 5, 6 as input signals and that they are processed with the aid of the respective control circuit 7.

It is understood that the different units 2, 3, 4, 5, 6 can also generate still other output signals, or respectively that they can be acted upon by other input signals.

What is claimed is:

1. A compressed air processing system for the preparation of compressed air, comprising:

a plurality of individual units including a filter unit;

a system bus to which said plurality of individual units are coupled;

an interface through which said system bus is operatively linked with a customer bus; and a control device connected to the customer bus, and through the customer bus to said interface and said system bus for controlling operation of said plurality of individual units.

2. The compressed air processing system as defined in claim 1, wherein said plurality of individual units are also directly connectable to said control device.

3. The compressed air processing system as defined in claim 1, wherein the customer bus is associated with different protocols, and wherein said interface is adapted to serve the different protocols.

4. The compressed air processing system as defined in claim 3, wherein said system bus has a protocol associated therewith, which corresponds to one of the protocols of the customer bus.

5. The compressed air processing system as defined in claim 1, wherein said interface is embodied as a further unit.

6. The compressed air processing system as defined in claim 1, wherein said plurality of individual units are acted upon by an input signal via said system bus.

7. The compressed air processing system as defined in claim 1, wherein said plurality of individual units further include a regulating unit, and an oiler unit.

8. The compressed air processing system as defined in claim 7, wherein said filter unit is acted upon by an input signal for emptying a water separator.

9. The compressed air processing system as defined in claim 7, wherein said regulating unit is acted upon by an input signal for a desired pressure.

10. The compressed air processing system as defined in claim 7, wherein said oiler unit is acted upon by an input signal for releasing a defined amount of oil.

11. The compressed air processing system as defined in claim 7, wherein said filter unit is acted upon by an input signal for emptying a water separator, said regulating unit is acted upon by an input signal for a desired pressure, and said oiler unit is acted upon by an input signal for releasing a defined amount of oil.

12. The compressed air processing system as defined in claim 1, wherein an output signal is emitted via said system bus from at least one of said plurality of individual units.

13. The compressed air processing system as defined in claim 7, wherein an output signal indicative of the fill level of water of a water separator is omitted by said filter unit.

14. The compressed air processing system as defined in claim 7, wherein an output signal indicative of an existing pressure by said regulating unit is generated.

15. The compressed air processing system as defined in claim 7, wherein and output signal indicative of the fill level of an oil reservoir by said oiler unit is generated.

16. The compressed air processing system as defined in claim 7, wherein an output signal indicative of the fill level of water of a water separator is omitted by said filter unit, wherein an output signal indicative of an existing pressure by said regulating unit is generated, and wherein an output signal indicative of the fill level of an oil reservoir by said oiler unit is generated.

* * * * *